US010608964B2

(12) United States Patent
Hernandez Santisteban et al.

(10) Patent No.: US 10,608,964 B2
(45) Date of Patent: Mar. 31, 2020

(54) BOT AUDIO DATE UPDATING

(71) Applicant: Microsoft Technology Licensing, LLC, Redmond, WA (US)

(72) Inventors: Adolfo Hernandez Santisteban, Bothell, WA (US); Christian Michael Sadak, Seattle, WA (US); Donna Katherine Long, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 89 days.

(21) Appl. No.: 15/627,344

(22) Filed: Jun. 19, 2017

(65) Prior Publication Data

US 2018/0367474 A1   Dec. 20, 2018

(51) Int. Cl.
| | |
|---|---|
| *G06F 15/16* | (2006.01) |
| *H04L 12/58* | (2006.01) |
| *H04L 29/08* | (2006.01) |
| *H04L 29/06* | (2006.01) |

(52) U.S. Cl.
CPC ............ *H04L 51/02* (2013.01); *H04L 67/141* (2013.01); *H04L 67/42* (2013.01)

(58) Field of Classification Search
CPC ................................ H04L 51/02; H04L 67/14
See application file for complete search history.

(56) References Cited

U.S. PATENT DOCUMENTS

| | | | |
|---|---|---|---|
| 6,119,101 A | 9/2000 | Peckover | |
| 7,162,728 B1 * | 1/2007 | Bahn | H04N 7/17318 |
| | | | 348/E7.071 |
| 7,861,252 B2 | 12/2010 | Uszok et al. | |
| 2002/0091832 A1 | 7/2002 | Low et al. | |
| 2007/0244980 A1 * | 10/2007 | Baker, III | G06Q 10/107 |
| | | | 709/207 |

(Continued)

OTHER PUBLICATIONS

Raja, et al., "Now, a sonic identity for brands", http://www.afaqs.com/news/story/34139_Now-a-sonic-identity-for-brands, May 23, 2012, 4 pages.

(Continued)

*Primary Examiner* — Hua Fan
(74) *Attorney, Agent, or Firm* — Alleman Hall Creasman & Tuttle LLP

(57) ABSTRACT

A server computing device is provided, including a processor configured to execute a bot server program. The processor may provide a dialog for a first bot of the bot server program, the dialog including at least one trigger condition for transmitting default audio data. The processor may receive an audio data update communication from a bot developer computing device. Based on the audio data update communication, the processor may replace the default audio data with updated audio data. The processor may establish a first communication channel between the first bot and a client computing device. The first communication channel may allow one or more communications to be transmitted between the first bot and the client computing device based on the dialog. The processor may transmit a first communication to the client computing device via the first communication channel. The first communication may include the updated audio data.

15 Claims, 8 Drawing Sheets

(56) References Cited

U.S. PATENT DOCUMENTS

2016/0044380 A1    2/2016  Barrett

OTHER PUBLICATIONS

Fahey, Colleen, "How Audio Branding Simplifies a Brand's Communications", http://thefuturebuzz.com/2014/09/11/how-audio-branding-simplifies-a-brands-communications/, Published on: Sep. 11, 2014, 7 pages.

Goh, et al., "Intelligent Agent Technology in E-commerce", In Proceedings of International Conference on Intelligent Data Engineering and Automated Learning, Mar. 21, 2003, 3 pages.

Gustafsson, Clara, "Sonic branding: A consumer-oriented literature review", In Journal of Brand Management, vol. 22, Issue 1, Jan. 2015, 28 pages.

"Healthtap", http://www.topbots.com/project/healthtap-facebook-messenger-bot-guide/, Retrieved on: Apr. 13, 2017, 4 pages.

* cited by examiner

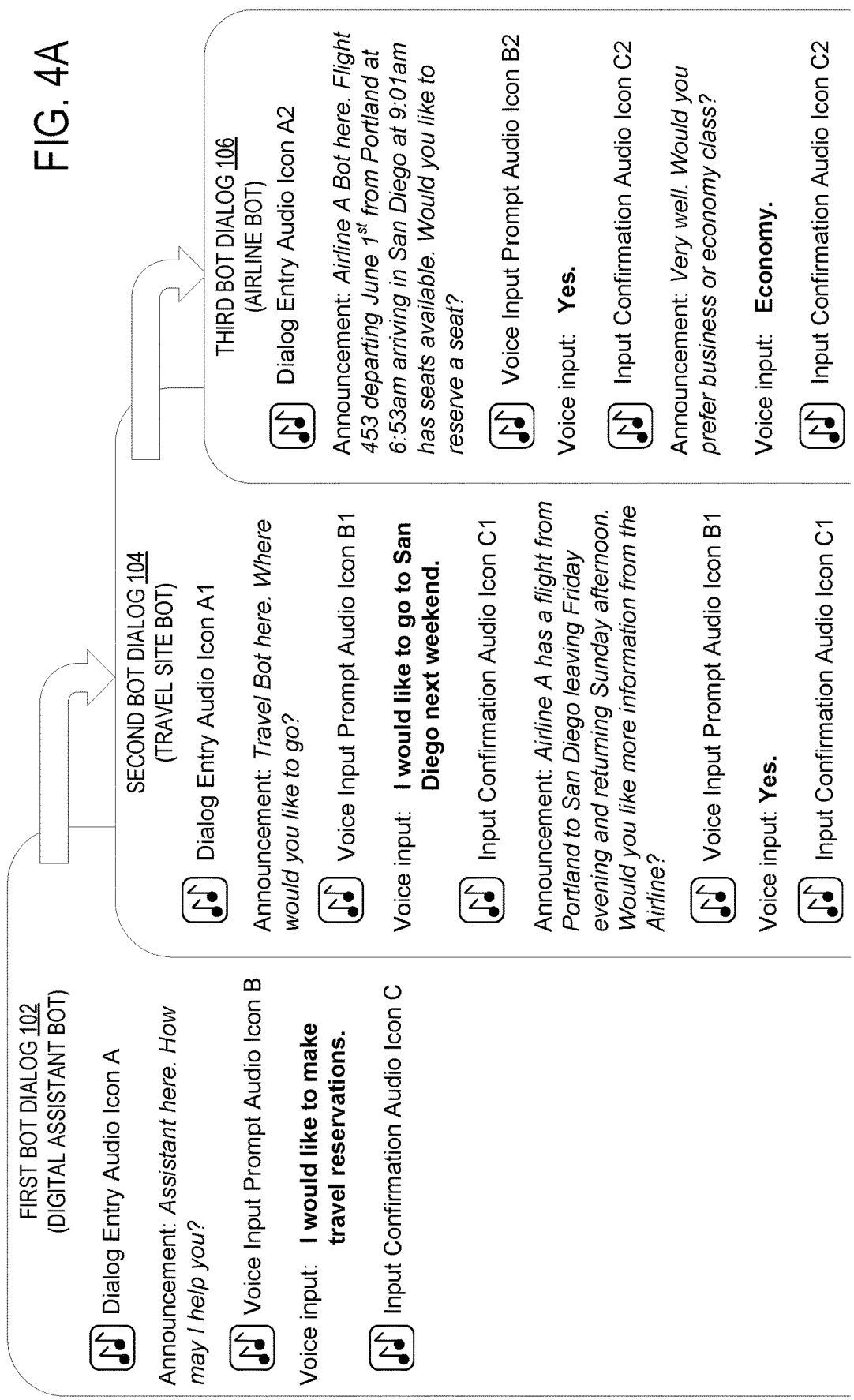

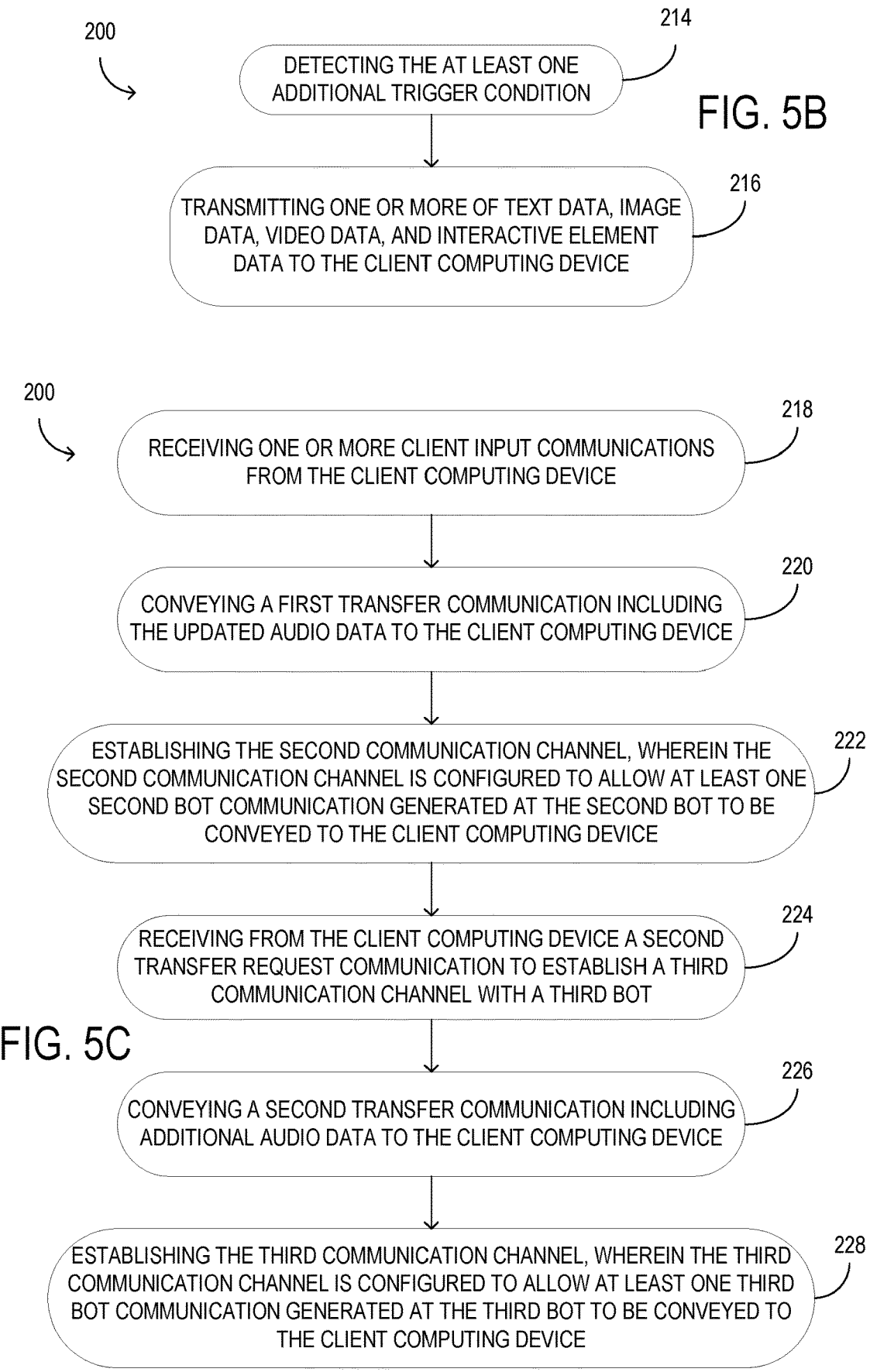

BOT AUDIO DATE UPDATING

BACKGROUND

Chatbots (henceforth called bots) are software programs that are built around a messaging paradigm in which a chat client program exchanges data with a server-side chatbot program. Chatbot programs may be built, for example, using the Microsoft® Bot Framework, or other framework. Chatbot programs developed with such a framework can be designed to send and receive messages with various user-side chat client programs. A chatbot may, in this way, conduct a conversation with a user.

SUMMARY

According to one aspect of the present disclosure, a server computing device is provided, comprising a processor configured to execute a bot server program. The processor may be configured to provide a dialog for a first bot of the bot server program, the dialog including at least one trigger condition for transmitting default audio data. The processor may be further configured to receive an audio data update communication from a bot developer computing device. Based on the audio data update communication, the processor may be further configured to replace the default audio data with updated audio data. The processor may be further configured to establish a first communication channel between the first bot and a client computing device. The first communication channel may be configured to allow one or more communications to be transmitted between the first bot and the client computing device based on the dialog. The processor may be further configured to transmit a first communication to the client computing device via the first communication channel. The first communication may include the updated audio data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B show an example use case scenario in which a first bot dialog, a second bot dialog, and a third bot dialog are arranged in a bot dialog stack, according to the embodiment of FIG. 1.

FIG. 5B shows additional steps that may optionally be performed in some embodiments as part of the method of FIG. 4A.

FIG. 5C shows additional steps that may optionally be performed in some embodiments as part of the method of FIG. 4A.

DETAILED DESCRIPTION

A conversation between a chatbot and a user may also include additional chatbots, and during such conversations, the chatbot with which the user is currently interacting may change. The inventors of the subject application have recognized that, when a chatbot hands off the conversation to another chatbot, the chatbot with which the user is currently interacting may be unclear to the user. Chatbots may be provided with a set of default or standard audio sounds, but the inventors recognized drawbacks associated with using those standard or default sounds to signal to a user a change in chatbots. First, since those sounds are typically used in other interactions with the chatbot their meaning may be confused. Second, since such sounds are standardly played by the chatbot, they may not stand out and grab the user's attention. Thus, the inventors considered that standard audio feedback sounds may not allow users to easily distinguish between chatbots.

Figure 1:
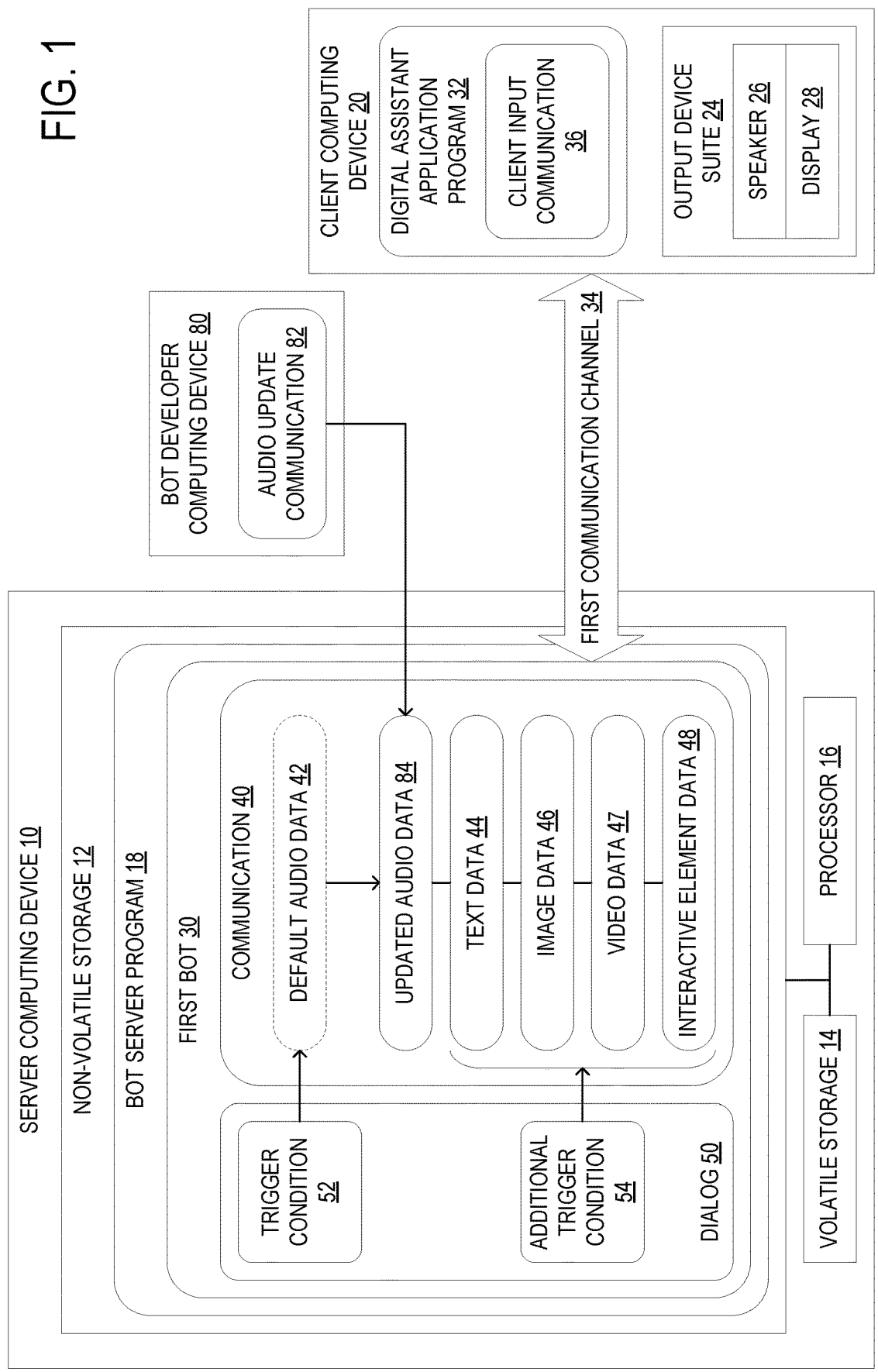
FIG. 1 schematically shows a server computing device, according to one embodiment of the present disclosure.

In order to address the issue discussed above, a server computing device is provided. FIG. 1 schematically depicts a server computing device 10 according to one embodiment of the present disclosure. The server computing device 10 shown in FIG. 1 includes non-volatile storage 12, volatile storage 14, and a processor 16 configured to execute a bot server program 18. The bot server program 18 provides a dialog 50 for a first bot 30 of the bot server program 18. The dialog 50 may be a protocol used by the first bot 30 to generate outputs in response to inputs received from a client computing device 20. In some embodiments, the first bot 30 may include a plurality of dialogs 50. The plurality of dialogs 50 may be arranged in a stack, as shown in more detail in FIG. 3.

The dialog 50 includes at least one trigger condition 52 for transmitting a communication 40 including default audio data 42 to the client computing device 20. For example, the processor 16 may be configured to transmit default audio data 42 to the client computing device 20 when the dialog 50 begins or ends. The processor 16 may be configured to establish a first communication channel 34 between the first bot 30 and the client computing device 20. The first communication channel 34 may be configured to allow one or more communications 40 to be transmitted between the first bot 30 and the client computing device 20 based on the dialog 50.

The default audio data 42 may include instructions for the client computing device 20 to play a default sound on a speaker 26 included in an output device suite 24 of the client computing device 20. In addition to the default audio data 42, the communication 40 may further include text data 44, image data 46, video data 47, and/or interactive element data 48. In response to receiving the communication 40, the client computing device 20 may display one or more text item, image, video, and/or interactive element on a display 28 included in the output device suite 24 based on the text data 44, image data 46, video data 47, and/or interactive element data 48 respectively. The output device suite 24 of the client computing device 20 may additionally or alternatively include other output devices configured to output other types of output.

The processor 16 may be further configured to receive an audio data update communication 82 from a bot developer computing device 80. Based on the audio data update communication 82, the processor 16 may be further configured to replace the default audio data 42 with updated audio data 84 in the communication 40. In some embodiments, the audio data update communication 82 may include instructions to generate the updated audio data 84 by applying a modification to the default audio data 42. For example, the modification applied to the default audio data 42 may include one or more of a pitch shift, a volume change, and a duration change. By updating the default audio data 42 to updated audio data 84, a bot developer may make communications 40 transmitted by the first bot 30 distinguishable from communications transmitted by other bots. For example, a company may use updated audio data 84 to make audio communications made by the bot more consistent with a desired image or brand of the company.

The updated audio data 84 may indicate any of a variety of types of event that may occur during a conversation with a bot. The updated audio data 84 may be selected from a group consisting of transfer audio data indicating transfer to another bot; approval audio data indicating that an action may be or has been performed; disapproval audio data indicating that an action may not be or has not been performed; error audio data indicating that an error has occurred at a client-side or server side computer application program; input prompt audio data prompting the user to enter an input; dialog entry audio data indicating the beginning of a dialog; dialog resolution audio data indicating the end of a dialog; and update notification audio data indicating an update to a client-side or server-side computer application program. Other types of updated audio data 84 are also contemplated. A default version of each of the above types of updated audio data 84 may be stored in the bot application program 18.

Following the replacement of the default audio data 42 with the updated audio data 84, the first bot 30 bot server program 18 may establish a first communication channel 34 with the client computing device 20 and transmit one or more communications 40 to the client computing device 20 as described above, except that when the first bot 30 detects the trigger condition 52, instead of generating a communication 40 that includes the default audio data 42 in response to the trigger condition 52, the first bot 30 may instead generate a communication 40 that includes the updated audio data 84. The processor 16 may be further configured to transmit a first communication 40 to the client computing device 20 via the first communication channel 34, wherein the first communication 40 includes the updated audio data 84.

The one or more communications 40 transmitted over the first communication channel 34 may further include one or more of text data 44, image data 46, video data 47, and interactive element data 48. In some embodiments, the dialog 50 may further include at least one additional trigger condition 54. In such embodiments, in response to detecting the at least one additional trigger condition 54, the processor 16 may be further configured to transmit the one or more of text data 44, image data 46, video data 47, and interactive element data 48 to the client computing device 20. For example, the first bot 30 may receive a request to display an image of a product. This request may satisfy an additional trigger condition 54 to transmit image data 46 encoding an image of the product to the client computing device 20.

The processor 16 may be further configured to receive one or more client input communications 36 from the client computing device 20. The one or more client input communications 36 may be natural language inputs. In some embodiments, the one or more client input communications 36 may be received from a digital assistant application program 32 executed by the client computing device 20. In other embodiments, the one or more client input communications 36 may be entered by a user. Embodiments in which the one or more client input communications 36 include both client input communications 36 received from a digital assistant application program 32 and client input communications 36 entered by a user are also contemplated.

Figure 2:
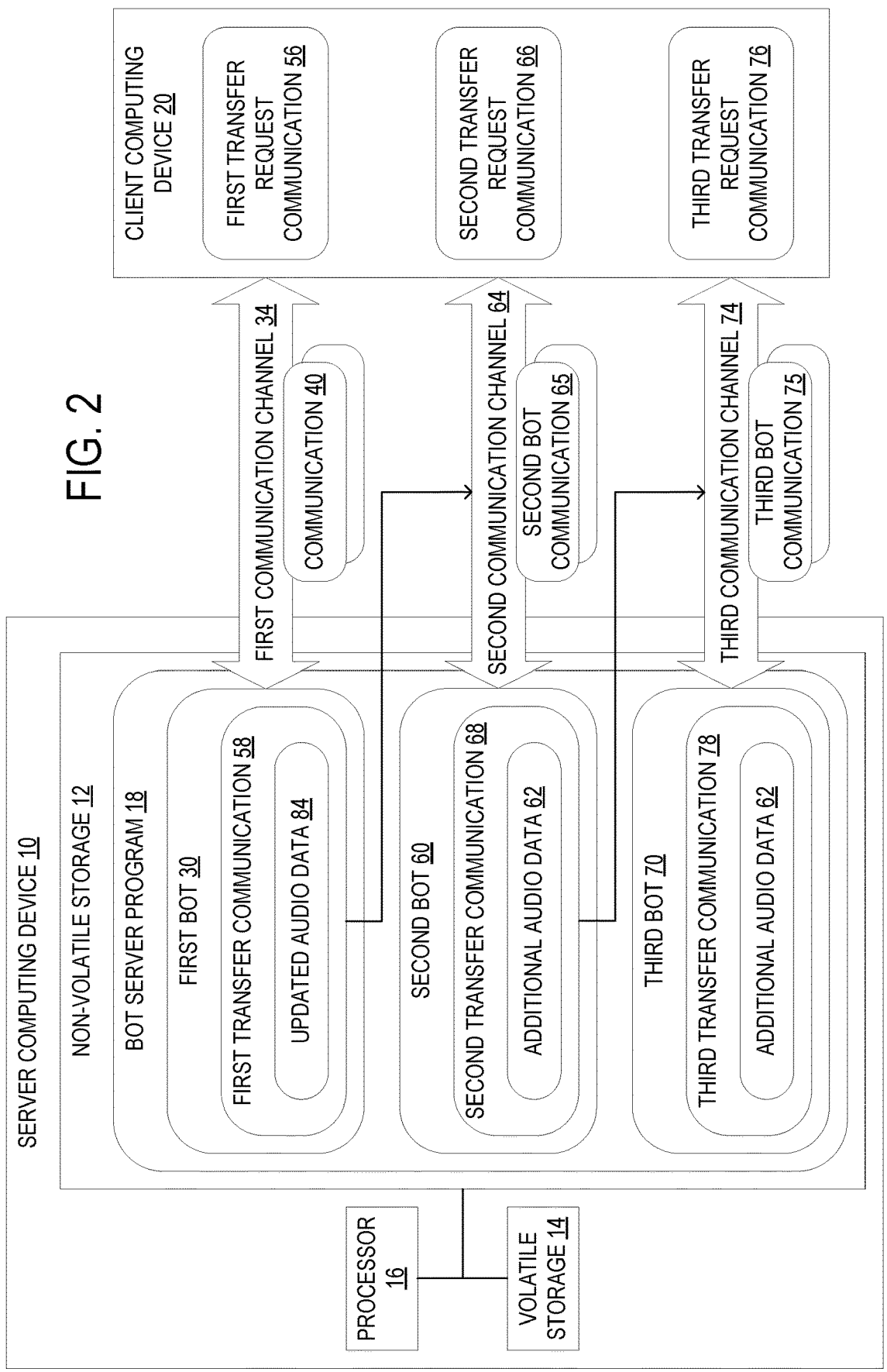
FIG. 2 shows a server computing device receiving a first transfer request communication to establish a second communication channel with a second bot, according to the embodiment of FIG. 1.

FIG. 2 schematically depicts the server computing device 10 of FIG. 1 in an embodiment in which the one or more client input communications 36 include a first transfer request communication 56 to establish a second communication channel 64 with a second bot 60. In response to receiving the first transfer request communication 56, the processor 16 may be configured to convey a first transfer communication 58 including the updated audio data 84 to the client computing device 20. The first transfer communication 58 may further include one or more of text data 44, image data 46, video data 47, and interactive element data 48. The processor 16 may be further configured to establish the second communication channel 64. The second communication channel 64 may be configured to allow one or more second bot communications 65 generated at the second bot 60 to be conveyed to the client computing device 20. The second communication channel 64 may also allow one or more client input communications 36 to be transmitted from the client computing device 20 to the second bot 60.

In some embodiments, the one or more client input communications 36 transmitted from the client computing device 20 to the second bot 60 may include a second transfer request communication 66 to establish a third communication channel 74 with a third bot 70. In such embodiments, the processor 16 may be further configured to convey a second transfer communication 68 including additional audio data 62 to the client computing device 20. The processor 16 may then establish the third communication channel 74. The third communication channel 74 may be configured to allow one or more third bot communications 75 generated at the third bot 70 to be conveyed to the client computing device 20. Embodiments in which the bot server program 18 includes more than three bots are also contemplated. For example, the third bot 70 may be configured to convey a third transfer communication 78, including additional audio data 62, to the client computing device 20 in response to receiving a third transfer request communication 76. Also, in some embodiments, the third bot 70 may be the first bot 30, and the third communication channel 74 may be established between the first bot 30 and the client computing device 20. In embodiments including more than three bots, communication channels between the client computing device 20 and any previously accessed bot are contemplated.

Figure 3:
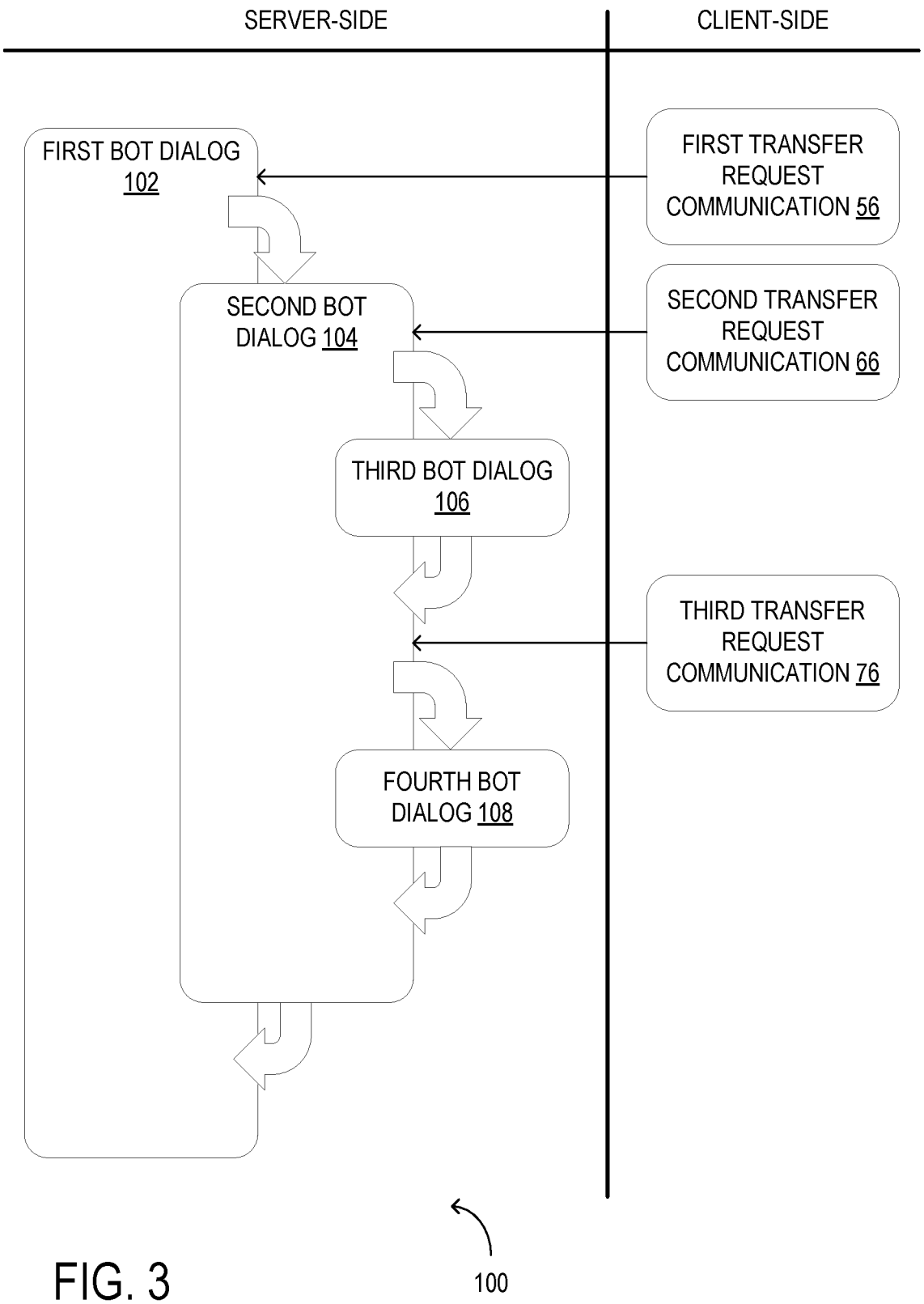
FIG. 3 shows an example dialog stack, according to the embodiment of FIG. 1.

FIG. 3 depicts an example dialog stack 100 executed by the bot server program 18 of FIG. 1. Each dialog in the example dialog stack 100 may include one or more communications transmitted to the client computing device 20 by the server computing device 10 and/or to the server computing device 10 by the client computing device 20. The example dialog stack 100 begins at a first bot dialog 102. In response to a first transfer request communication 56 received from the client computing device, a second bot dialog 104 may be added to the dialog stack 100 above the first bot dialog. A third bot dialog 106 may be further added to the dialog stack 100 above the second bot dialog 104 in response to a second transfer request communication 76. In the example dialog stack 100 depicted in FIG. 3, the third bot dialog 106 is allowed to resolve. When a bot dialog resolves, the bot server program 18 may execute another bot dialog below that bot dialog in the bot dialog stack 100. Here, the bot server program 18 returns to the second bot dialog 104. The bot server program 18 then receives a third transfer request communication 76 from the client computing device 20, in response to which the bot server program 18 adds to the dialog stack 100 a fourth bot dialog 108 that processes communications between the client computing device 20 and a fourth bot of the bot server program 18. The fourth bot dialog 108 resolves, and the bot server program 18 returns to the second bot dialog 104. The second bot dialog 104 then resolves, and the bot server program 18 returns to the first bot dialog 102. Finally, the first bot dialog 102 resolves.

Figure 4B:
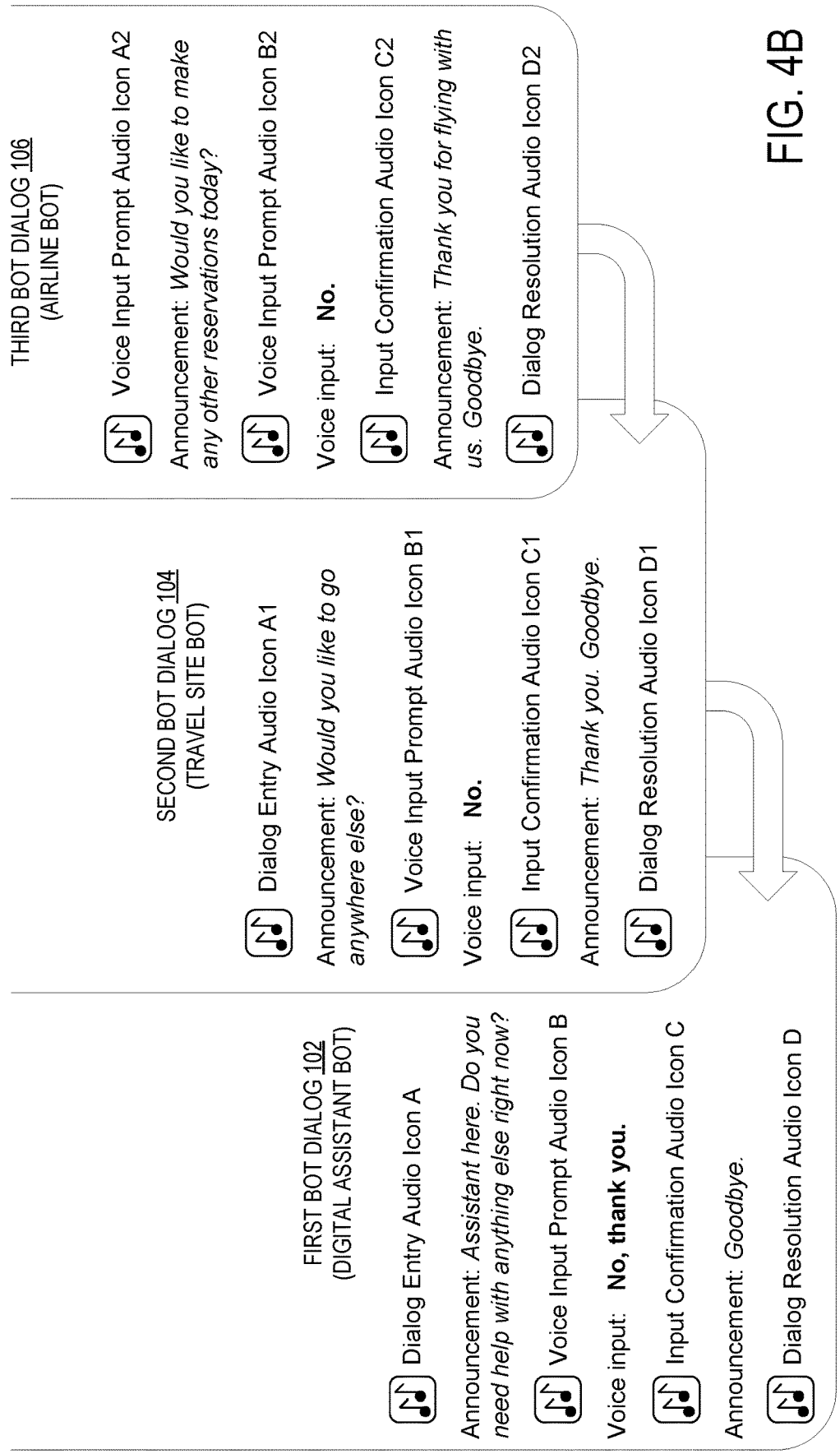

FIGS. 4A and 4B show an example use case scenario including bot dialogs arranged in a bot dialog stack. In the example use case scenario, a user first communicates with a digital assistant bot in a first bot dialog 102. At the beginning of the first bot dialog 102, upon establishing the first communication channel 34 between the server computing device 10 and the client computing device 20, the digital assistant bot transmits a dialog entry audio icon A, which may be a default dialog entry audio icon, to the client computing device 20. The digital assistant bot then transmits an announcement to the client computing device 20. The digital assistant bot also transmits a voice input prompt audio icon B, which may be a default voice input prompt audio icon, to the client computing device 20 to prompt the user to enter a voice input. In response to receiving a voice input from the client computing device 20, the digital assistant bot transmits an input confirmation audio icon C, which may be a default input confirmation audio icon, to the client computing device 20.

In the example of FIGS. 4A and 4B, the voice input received from the client computing device 20 includes a prompt to make travel reservations using a travel site bot. In response to this prompt, the bot server program 18 adds a second bot dialog 104 to the bot dialog stack. At the beginning of the second bot dialog 104, the travel site bot may convey a dialog entry audio icon A1 to the client computing device 20. The dialog entry audio icon A1 of the second bot dialog 104 may replace the dialog entry audio icon A of the first bot dialog 102, and may be an updated audio icon generated by modifying the dialog entry audio icon A of the first bot dialog 102. The dialog entry audio icon A1 of the second bot dialog 104 may be a transfer audio icon that indicates a transfer from the first bot dialog 102 to the second bot dialog 104. Following the dialog entry audio icon A1, the travel site bot transmits and announcement to the client computing device 20, followed by a voice input prompt audio icon B1. Similarly to the dialog entry audio icon A1, the voice input prompt audio icon B1 may be an updated voice input prompt audio icon that replaces the default voice input prompt audio icon. After receiving a voice input, the travel site bot may also transmit an input confirmation audio icon C1 to the client computing device 20. The input confirmation audio icon C1 may be an updated input confirmation audio icon that replaces a default input confirmation audio icon.

In response to a voice input requesting additional information about a flight, a third bot dialog 106 with an airline bot is added to the dialog stack. The third bot dialog 106 includes a dialog entry audio icon A2, a voice input prompt audio icon B2, an input confirmation audio icon C2, and a dialog resolution audio icon D2. Similarly to in the second bot dialog 104, each audio icon included in the third bot dialog 106 may replace a default audio icon. At the end of the third bot dialog 106, the airline bot transmits the dialog resolution audio icon D2 to the client computing device 20. The airline bot then resolves the third bot dialog 106, and the second bot dialog 104 resumes. At the end of the second bot dialog 104, a dialog resolution audio icon D1 is conveyed to the client computing device 20. The dialog resolution audio icon D1 of the second bot dialog 104 may be an updated dialog resolution audio icon that replaces a default dialog resolution audio icon. The second bot dialog 104 then resolves, and the first bot dialog 102 resumes. When the first bot dialog 102 ends, the digital assistant bot transmits a dialog resolution audio icon D, which may be a default dialog resolution audio icon, to the client computing device 20.

Figure 5A:
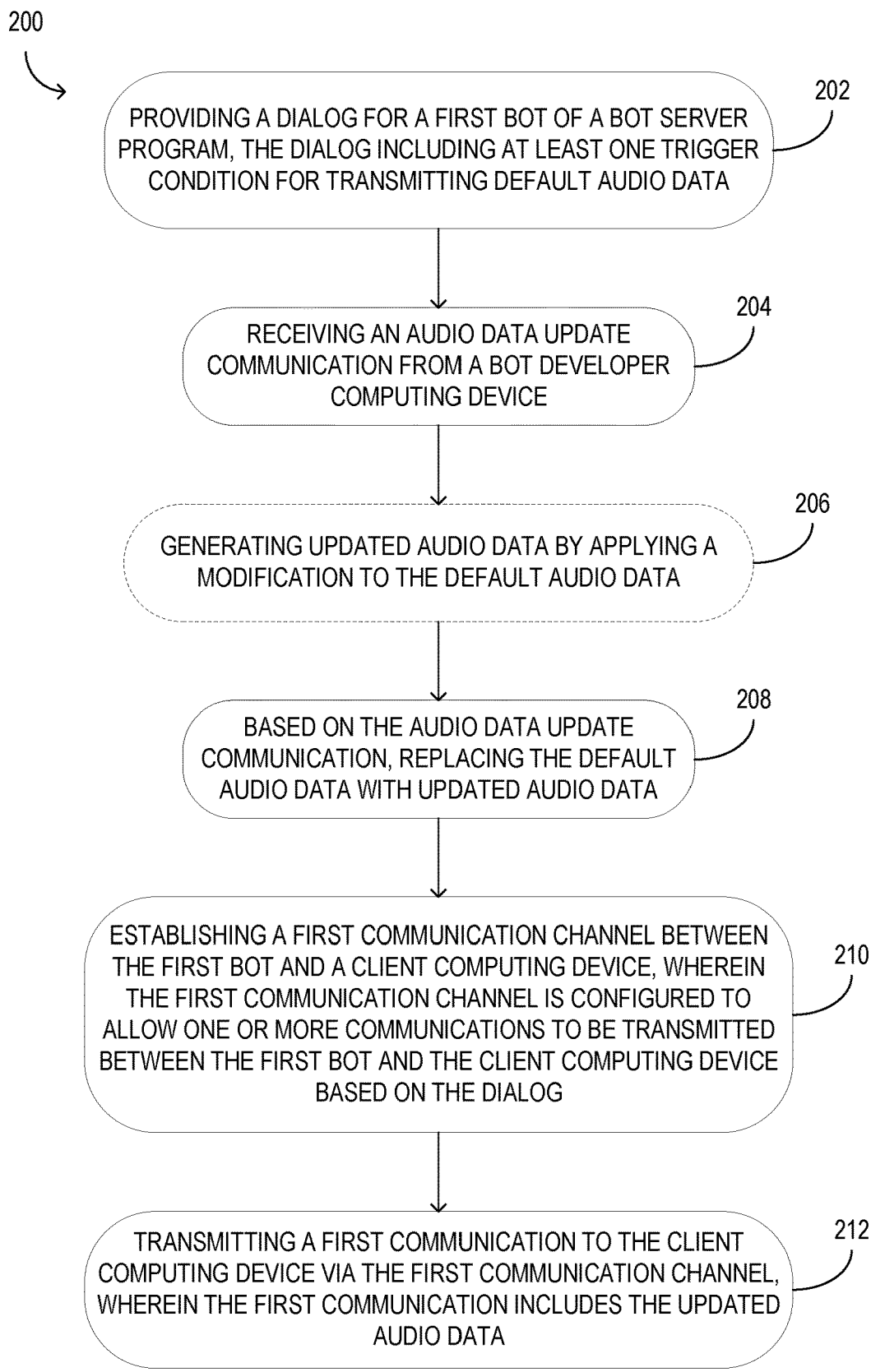
FIG. 5A shows a flowchart of a method for use with a server computing device, according to the embodiment of FIG. 1.

FIG. 5A depicts a flowchart of a method 200 performed by a server computing device, which may be the server computing device 10 of FIG. 1. At step 202, the method 200 may include providing a dialog for a first bot of a bot server program, the dialog including at least one trigger condition for transmitting default audio data. At step 204, the method 200 may further include receiving an audio data update communication from a bot developer computing device. At step 206, the method 200 may optionally include generating updated audio data by applying a modification to the default audio data. Alternatively, the updated audio data may be generated by some other means. At step 208, the method 200 may further include, based on the audio data update communication, replacing the default audio data with the updated audio data. At step 210, the method 200 may further include establishing a first communication channel between the first bot and a client computing device. The first communication channel may be configured to allow one or more communications to be transmitted between the first bot and the client computing device based on the dialog. At step 212, the method may further include transmitting a first communication to the client computing device via the first communication channel. The first communication may include the updated audio data.

Additional steps that may optionally be performed as part of the method 200 are shown in FIG. 5B. The steps shown in FIG. 5B may be performed in embodiments in which the dialog further includes at least one additional trigger condition for transmitting one or more communications to the client computing device. At step 214, the method may include detecting the at least one additional trigger condition. At step 216, the method may include transmitting one or more of text data, image data, video data, and interactive element data to the client computing device.

FIG. 5C shows additional steps that may optionally be performed as part of the method 200 in some embodiments. At step 218, the method 200 may include receiving at least one client input communication from the client computing device. In some embodiments, the at least one client input communication may be received from a digital assistant application program executed by the client computing device. Additionally or alternatively, the at least one client input communication may be a first transfer request communication to establish a second communication channel with a second bot. At step 220, when the at least one client input communication is a first transfer request communication, the method 200 may include conveying a first transfer communication including the updated audio data to the client computing device via the first communication channel. At step 222, the method 200 may further include establishing the second communication channel. The second communication channel may be configured to allow at least one second bot communication generated at the second bot to be conveyed to the client computing device. In some embodiments, the method 200 may further include, at step 224, receiving from the client computing device a second transfer request communication to establish a third communication channel with a third bot. In such embodiments, the method 200 may further include, at step 226, conveying a second transfer communication including additional audio data to the client computing device. The method 200 may further include, at step 228, establishing the third communication channel. The third communication channel may be configured to allow at least one third bot communication generated at the third bot to be conveyed to the client computing device. In some embodiments, the third bot may be the first bot, and the third communication channel may be established between the first bot and the client computing device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
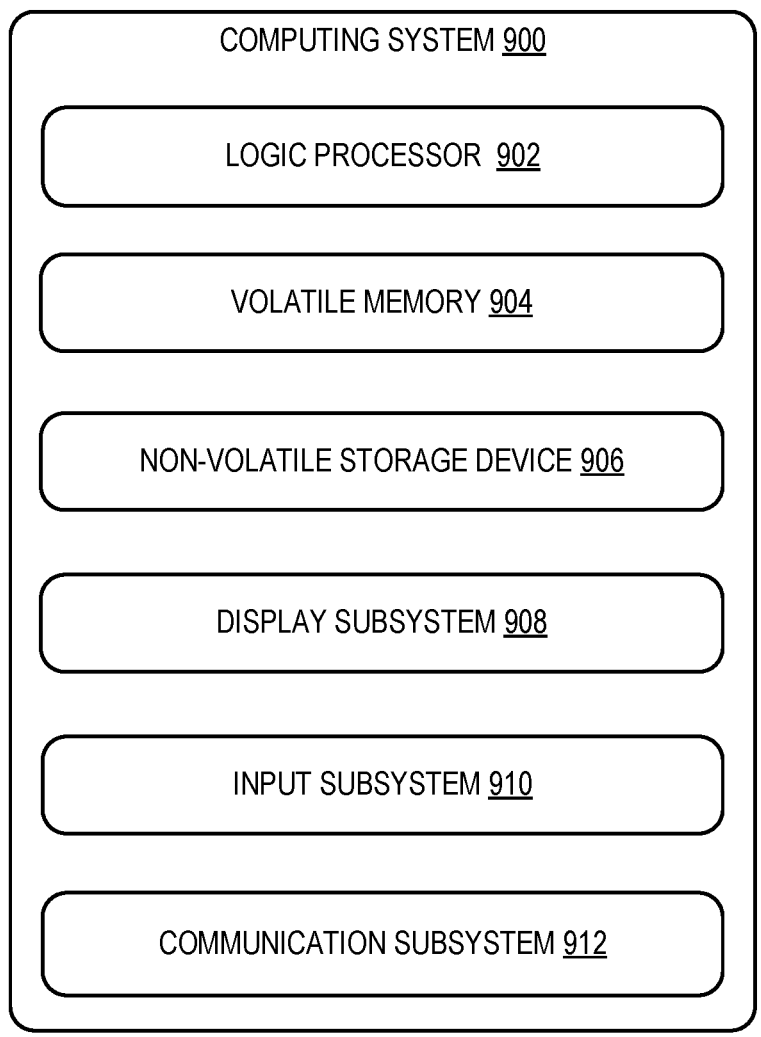
FIG. 6 shows an example computing system, according to an embodiment of the present disclosure.

FIG. 6 schematically shows a non-limiting embodiment of a computing system 900 that can enact one or more of the methods and processes described above. Computing system 900 is shown in simplified form. Computing system 900 may embody the server computing device 10 of FIG. 1. Computing system 900 may take the form of one or more personal computers, server computers, tablet computers, home-entertainment computers, network computing devices, gaming devices, smart speakers, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 6.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

According to one aspect of the present disclosure, a server computing device is provided, comprising a processor configured to execute a bot server program. The processor may be configured to provide a dialog for a first bot of the bot server program. The dialog may include at least one trigger condition for transmitting default audio data. The processor may be further configured to receive an audio data update communication from a bot developer computing device. Based on the audio data update communication, the processor may be further configured to replace the default audio data with updated audio data. The processor may be further configured to establish a first communication channel between the first bot and a client computing device. The first communication channel may be configured to allow one or more communications to be transmitted between the first bot and the client computing device based on the dialog. The processor may be further configured to transmit a first communication to the client computing device via the first communication channel, wherein the first communication includes the updated audio data.

According to this aspect, the processor may be further configured to receive one or more client input communications from the client computing device.

According to this aspect, the one or more client input communications may be received from a digital assistant application program executed by the client computing device.

According to this aspect, the client input communication may be a first transfer request communication to establish a second communication channel with a second bot. The processor may be further configured to convey a first transfer communication including the updated audio data to the client computing device. The processor may be further configured to establish the second communication channel. The second communication channel may be configured to allow one or more second bot communications generated at the second bot to be conveyed to the client computing device.

According to this aspect, the processor may be further configured to receive from the client computing device a second transfer request communication to establish a third communication channel with a third bot. The processor may be further configured to convey a second transfer communication including additional audio data to the client computing device. The processor may be further configured to establish the third communication channel. The third communication channel may be configured to allow one or more third bot communications generated at the third bot to be conveyed to the client computing device.

According to this aspect, the third bot may be the first bot, and the third communication channel may be established between the first bot and the client computing device.

According to this aspect, the updated audio data may be selected from a group consisting of transfer audio data, approval audio data, disapproval audio data, error audio data, input prompt audio data, dialog entry audio data, dialog resolution audio data, and update notification audio data.

According to this aspect, the audio data update communication may include instructions to generate the updated audio data by applying a modification to the default audio data.

According to this aspect, the modification applied to the default audio data may include one or more of a pitch shift, a volume change, and a duration change.

According to this aspect, the one or more communications may further include one or more of text data, image data, video data, and interactive element data.

According to this aspect, the dialog may further include at least one additional trigger condition, and, in response to detecting the at least one additional trigger condition, the processor may be further configured to transmit the one or more of text data, image data, video data, and interactive element data to the client computing device.

According to another aspect of the present disclosure, a method performed by a server computing device is provided. The method may comprise providing a dialog for a first bot of a bot server program. The dialog may include at least one trigger condition for transmitting default audio data. The method may further comprise receiving an audio data update communication from a bot developer computing device. The method may further comprise, based on the audio data update communication, replacing the default audio data with updated audio data. The method may further comprise establishing a first communication channel between the first bot and a client computing device. The first communication channel may be configured to allow one or more communications to be transmitted between the first bot and the client computing device based on the dialog. The method may further comprise transmitting a first communication to the client computing device via the first communication channel. The first communication may include the updated audio data.

According to this aspect, the method may further comprise receiving one or more client input communications from the client computing device.

According to this aspect, the one or more client input communications may be received from a digital assistant application program executed by the client computing device.

According to this aspect, the one or more client input communications may include a first transfer request communication to establish a second communication channel with a second bot. The method may further comprise conveying a first transfer communication including the updated audio data to the client computing device. The method may further comprise establishing the second communication channel. The second communication channel may be configured to allow at least one second bot communication generated at the second bot to be conveyed to the client computing device.

According to this aspect, the method may further comprise receiving from the client computing device a second transfer request communication to establish a third communication channel with a third bot. The method may further comprise conveying a second transfer communication including additional audio data to the client computing device. The method may further comprise establishing the third communication channel. The third communication channel may be configured to allow at least one third bot communication generated at the third bot to be conveyed to the client computing device.

According to this aspect, the third bot may be the first bot, and the third communication channel may be established between the first bot and the client computing device.

According to this aspect, the method may further comprise generating the updated audio data by applying a modification to the default audio data.

According to this aspect, the dialog may further include at least one additional trigger condition. The method may further comprise detecting the at least one additional trigger condition. The method may further comprise transmitting one or more of text data, image data, video data, and interactive element data to the client computing device.

According to another aspect of the present disclosure, a server computing device is provided, comprising a processor configured to execute a bot server program. The processor may be configured to provide a dialog for a first bot of the bot server program. The dialog may include at least one trigger condition for transmitting data to a client computing device. The processor may be further configured to receive an audio data update communication from a bot developer computing device. Based on the audio data update communication, the processor may be further configured to modify the dialog to include the audio data. The processor may be further configured to establish a first communication channel between the first bot and a client computing device. The first communication channel may be configured to allow one or more communications to be transmitted between the first bot and the client computing device based on the dialog. The processor may be further configured to transmit a first communication to the client computing device via the first communication channel. The first communication may include the audio data.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A server computing device, comprising:
a processor configured to execute a bot server program, to:
provide a dialog for a first bot of the bot server program, the dialog including at least one trigger condition for transmitting a communication including default audio data, wherein the default audio data includes instructions for a client computing device to play a default sound;
receive an audio data update communication from a bot developer computing device;
based on the audio data update communication, replace the default audio data with updated audio data;
establish a first communication channel between the first bot and the client computing device, wherein the first communication channel is configured to allow one or more communications to be transmitted between the first bot and the client computing device based on the dialog;
receive one or more client input communications from the client computing device, wherein at least one of the one or more client input communications is a first transfer request communication to establish a second communication channel with a second bot;
transmit a first transfer communication to the client computing device via the first communication channel, wherein the first transfer communication includes the updated audio data; and
establish the second communication channel, wherein the second communication channel is configured to allow one or more second bot communications generated at the second bot to be conveyed to the client computing device.

2. The server computing device of claim 1, wherein the one or more client input communications are received from a digital assistant application program executed by the client computing device.

3. The server computing device of claim 1, wherein the processor is further configured to:
receive from the client computing device a second transfer request communication to establish a third communication channel with a third bot;
convey a second transfer communication including additional audio data to the client computing device; and
establish the third communication channel, wherein the third communication channel is configured to allow one or more third bot communications generated at the third bot to be conveyed to the client computing device.

4. The server computing device of claim 3, wherein the third bot is the first bot, and wherein the third communication channel is established between the first bot and the client computing device.

5. The server computing device of claim 1, wherein the updated audio data is selected from a group consisting of transfer audio data, approval audio data, disapproval audio data, error audio data, input prompt audio data, dialog entry audio data, dialog resolution audio data, and update notification audio data.

6. The server computing device of claim 1, wherein the audio data update communication includes instructions to generate the updated audio data by applying a modification to the default audio data.

7. The server computing device of claim 6, wherein the modification applied to the default audio data includes one or more of a pitch shift, a volume change, and a duration change.

8. The server computing device of claim 1, wherein the one or more communications further include one or more of text data, image data, video data, and interactive element data.

9. The server computing device of claim 8, wherein the dialog further includes at least one additional trigger condition, and wherein, in response to detecting the at least one additional trigger condition, the processor is further configured to transmit the one or more of text data, image data, video data, and interactive element data to the client computing device.

10. A method performed by a server computing device, the method comprising:
providing a dialog for a first bot of a bot server program, the dialog including at least one trigger condition for transmitting a communication including default audio data, wherein the default audio data includes instructions for a client computing device to play a default sound;
receiving an audio data update communication from a bot developer computing device;
based on the audio data update communication, replacing the default audio data with updated audio data;
establishing a first communication channel between the first bot and the client computing device, wherein the first communication channel is configured to allow one or more communications to be transmitted between the first bot and the client computing device based on the dialog;
receiving one or more client input communications from the client computing device, wherein at least one of the one or more client input communications is a first transfer request communication to establish a second communication channel with a second bot;
transmitting a first transfer communication to the client computing device via the first communication channel, wherein the first transfer communication includes the updated audio data; and
establishing the second communication channel, wherein the second communication channel is configured to allow one or more second bot communications generated at the second bot to be conveyed to the client computing device.

11. The method of claim 10, wherein the one or more client input communications are received from a digital assistant application program executed by the client computing device.

12. The method of claim 10, further comprising:
receiving from the client computing device a second transfer request communication to establish a third communication channel with a third bot;
conveying a second transfer communication including additional audio data to the client computing device; and
establishing the third communication channel, wherein the third communication channel is configured to allow at least one third bot communication generated at the third bot to be conveyed to the client computing device.

13. The method of claim 12, wherein the third bot is the first bot, and wherein the third communication channel is established between the first bot and the client computing device.

14. The method of claim 10, further comprising generating the updated audio data by applying a modification to the default audio data.

15. The method of claim 10, wherein the dialog further includes at least one additional trigger condition, and wherein the method further comprises:
detecting the at least one additional trigger condition; and
transmitting one or more of text data, image data, video data, and interactive element data to the client computing device.

* * * * *